Nov. 15, 1960   M. G. STROMQUIST   2,959,861
BEVEL PROTRACTOR
Filed April 17, 1958
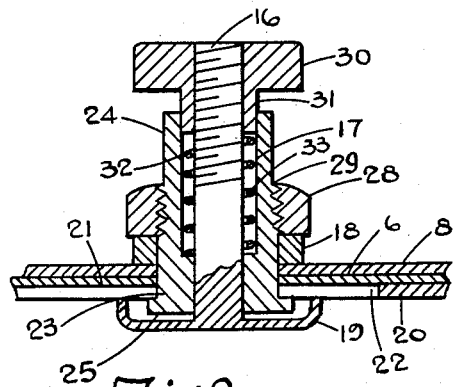
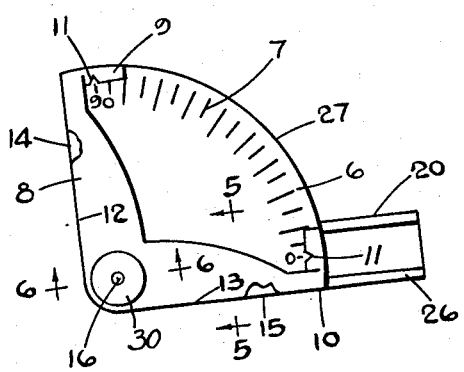
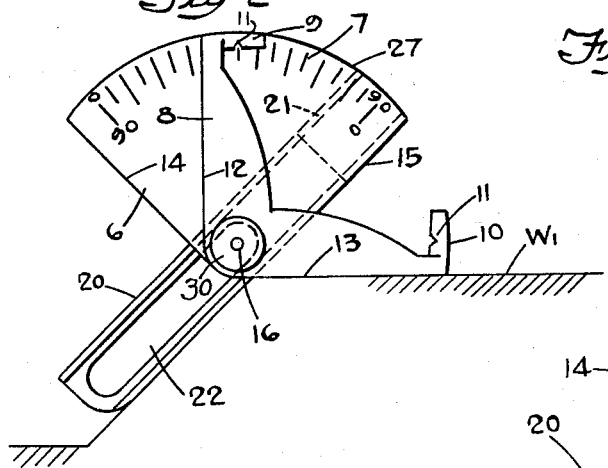
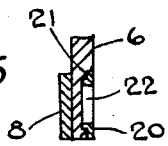
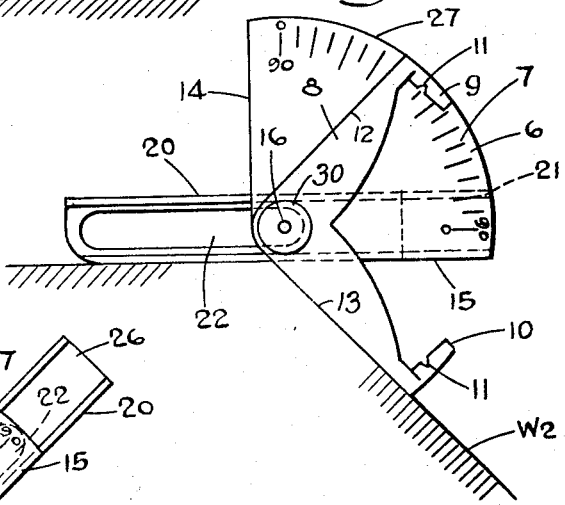
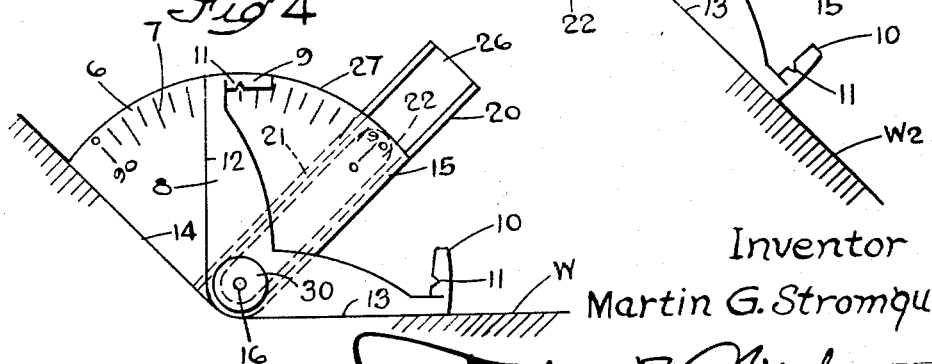
Inventor
Martin G. Stromquist
Atty.

United States Patent Office 2,959,861
Patented Nov. 15, 1960

2,959,861

BEVEL PROTRACTOR

Martin G. Stromquist, 123 S. London Ave., Rockford, Ill.

Filed Apr. 17, 1958, Ser. No. 729,135

10 Claims. (Cl. 33—94)

This invention relates to measuring instruments, such as bevel protractors, for use by machinists and inspectors for measuring bevels, and inside and outside angles generally, for which the ordinary 180° protractors are not usable, and for which other instruments available are far too complicated and expensive, besides being too awkward to use.

The principal objects of my invention are:

Firstly, to provide a bevel protractor that is easier to adjust and easier to read accurately, despite the small radius of the instrument;

Secondly, to provide a bevel protractor made up of a segmental-shaped right angle body, a cooperating pivoted right angle member on the front face of the body member, and a cooperating slide member on the back of the body member, the said body member and right angle member being used in the measurement of inside angles, and the slide member and right angle member being used in the measurement of outside angles;

Thirdly, to provide a bevel protractor of the kind described having an improved tension means which may be set to provide the desired friction drag to hold the right angle member in angularly adjusted relationship to the body member and also serve to hold the slide member in slidably adjusted relationship to the body member, and Fourthly, to provide a bevel protractor of the kind mentioned in which the right angle member has indicators on the outer ends of both arms to cooperate with graduations arcuately arranged on the body member reading in both directions, so that the right angle member may be swung in either direction with respect to the body member in the measurement of inside angles.

The invention is illustrated in the accompanying drawing, in which—

Fig. 1 is a face view of a bevel protractor made in accordance with my invention;

Figs. 2 and 3 show the bevel protractor in use with the slide member extended and the right angle member adjusted relative to the body member in measuring outside angles;

Fig. 4 shows the instrument being used in the measurement of an inside angle;

Fig. 5 is a sectional detail on the line 5—5 of Fig. 1, and

Fig. 6 is a section through the tension joint taken on line 6—6 of Fig. 1.

The same reference numerals are applied to corresponding parts throughout these views.

Referring to the drawings, the reference numeral 6 designates a segmental-shaped plate or body member of right angle form having suitable graduations thereon arranged in an arc, as indicated at 7, reading both ways from 0° to 90°, to simplify the matter of reading the angle when the cooperating right angle or L-shaped member 8 has one or the other of its two index portions 9 and 10 disposed over the graduations. Notches 11 in these index portions register with the 0° and 90° graduations on scale 7 when the right angle member 8 has its right angle edges 12 and 13 in register with the right angle edges 14 and 15 of the body member 6, as shown in Fig. 1. Pivot bolt 16 pivotally connects the parts 6 and 8 and, as will soon appear, carries a readily adjustable spring tension means, indicated at 17 in Fig. 6, to keep a washer 18 and the head portion 19 of the bolt 16 in spring-pressed friction-drag relationship to the top of right angle member 8 and the bottom of a slide 20 to hold the parts together tightly enough to maintain different adjusted relationships, while at the same time allowing easy enough angular adjustment of members 6 and 8 with respect to one another and sliding adjustment of member 20 with respect to member 6 when measuring angles on work, as shown in Figs. 2, 3, and 4. The slide 20, which, as best appears in Figs. 2–4, has one longitudinal edge thereof in register with the bottom edge 15 of the body member 6, is guided in and conformed in cross-section to a T-shaped groove 21 provided in the back of the body member 6 parallel to and along the edge 15, and there is a longitudinally extending slot 22 provided in the slide through which the cylindrical shank portion 23 of a stud 24 next to the head end 25 extends, this stud cooperating with the bolt 16 to form the pivotal connection for the members 6 and 8, while the slot 22 in slide 20 permits slidable adjustment of the slide with respect to member 6. One end of the slide 20 has one corner thereof arcuate and adapted to register with the arcuate apex of the segmental plate or body member 6, both arcs being struck on the same radius with the pivot 16 as a center, as best seen in Figs. 1 and 4. The slide 20 is also of such length in relation to the radial dimension of the segmental plate or body member 6 that the outer end portion of the straight-edge member projects from the plate, as seen in Figs. 1 and 4, when the straight-edge member is retracted from the extended operative position shown in Figs. 2 and 3. As seen in Fig. 5, the flat outer or back face of the straight-edge member 20 is in co-planar relationship to the back of the plate or body member 6.

In operation, only the members 6 and 8 are used in measuring an inside angle of a piece of work W, as shown in Fig. 4, but in the measurement of outside angles the slide 20, which in its fully retracted position, as shown in Figs. 1 and 4, has an end portion 26 exposed beyond the arcuate periphery 27 of the body member 6 for handier operation, is extended beyond the edge 14 of the body member 6, as shown in Figs. 2 and 3, to have abutment with one side of an outside angle while the right angle member 8 has abutment with the other side of the angle on a piece of work $W_1$ or $W_2$.

In closing, the adjustable spring tension means 17 incorporated in the pivot 16—24 forms the subject matter of my Patent No. 2,689,406, relating to "Bevel Protractor," issued September 21, 1954. This structure is designed to provide a more or less permanently adjustably fixed friction drag and also a readily adjustable spring tension to increase the resistance to relative pivotal movement of the parts 6 and 8 and relative sliding movement of the part 20 with respect to part 6 to whatever extent the operator may desire in a given situation. For the more or less permanently adjustably fixed friction drag, I rely upon the nut 28 threaded, as at 29, on the shank portion of the stud 24 above the washer 18, it being obvious that the nut 28 may be tightened a trifle to draw the parts together a little more tightly if more friction drag is desired, or it may be loosened a trifle if less friction drag is desired. For the readily adjustable spring tension, I rely upon the knurled nut 30 threaded on the bolt 16 and having its reduced cylindrical shank portion 31 slidable in a bore 32 provided in the stud 24 to compress a coiled tension spring 33 that rests against the bottom of the bore 32 and bears against the inner end of the shank 31. Thus, in a given situation, where a little additional friction drag is desired, one may quickly tighten the nut 30 and thus draw the head 19 up more firmly against the slide 20 and supplement the friction drag obtained by the tightening of the nut 28. In other words, the adjustment at 28 will take care of the usual needs so far as friction drag is concerned, and it is only when the operator wants some additional friction drag that he will tighten up on the nut 30 more or less to obtain the desired results.

It is believed the foregoing description conveys a good understanding of the objects and advantages of my invention. The appended claims have been drawn to cover all legitimate modifications and adaptations.

I claim:

1. A protractor of the character described comprising a plate having a bottom edge and a side edge at right angles to one another, an L-shaped member pivoted on and in close surface to surface abutment with said plate also having edges in right angle relationship adapted to register with the aforesaid edges of said plate, said L-shaped member being pivotally adjustable to different angles relative to said plate for the measurement of inside angles, said plate having an arcuately arranged scale thereon concentric with said pivot, said L-shaped member having pointers on both arms thereof movable relative to said scale in the pivotal adjustment of said L-shaped member relative to said plate, and an elongated straight-edge member slidably guided for endwise movement on the back of said plate having one longitudinal edge thereof in register with said bottom edge on said plate, said straight-edge member being extensible from retracted position relative to said plate to co-operate with said L-shaped member in the measurement of outside angles.

2. A protractor as set forth in claim 1, wherein said plate and said L-shaped member have registering arcuate outer edges struck on arcs of equal radius with the pivot of said L-shaped member as the center.

3. A protractor as set forth in claim 1, wherein said straight-edge member is of such length in relation to the radial dimension of said plate that the outer end portion of said straight-edge member projects from said plate when the said straight-edge member is moved to retracted position relative to said plate from an extended operative position.

4. A protractor as set forth in claim 1, wherein said straight-edge member is disposed in a recess provided in the back of said plate which serves as a guide, said straight-edge member having a flat outer face in coplanar relationship to the back of said plate.

5. A protractor as set forth in claim 1, wherein the pivot for said L-shaped member includes friction drag means resisting relative pivotal movement between the plate and L-shaped member, said means co-operating with said straight-edge member to resist endwise movement thereof.

6. A protractor as set forth in claim 5, wherein said straight-edge member has a longitudinal slot provided therein through which extends a part of said combination pivot and friction drag means serving to retain the straight-edge member in assembled relationship to said plate and limit endwise movement thereof.

7. A protractor as set forth in claim 6, wherein said plate member has a rounded corner joining the bottom and side edges struck on an arc with the pivot as a center, the L-shaped member having a registering rounded corner and said straight-edge member also having a rounded corner which in the retracted position of said straight-edge member registers with the rounded corner on said plate.

8. A protractor of the character described comprising a plate having a bottom edge and a side edge at right angles to one another, an L-shaped member pivoted on and in close surface to surface abutment with said plate also having edges in right angle relationship adapted to register with the aforesaid edges of said plate, said L-shaped member being pivotally adjustable to different angles relative to said plate for the measurement of inside angles, said plate having an arcuately arranged scale thereon concentric with said pivot, said L-shaped member having pointers on both arms thereof movable relative to said scale in the pivotal adjustment of said L-shaped member relative to said plate, and an elongated straight-edge member carried on the back of said plate normally in a retracted out of the way position but extensible to operative position as an extension of said bottom edge of said plate to co-operate with said L-shaped member in the measurement of outside angles.

9. A protractor of the character described comprising a plate having a bottom edge and a side edge at right angles to one another, an L-shaped member pivoted on and in close surface to surface abutment with said plate also having edges in right angle relationship adapted to register with the aforesaid edges of said plate, said L-shaped member being pivotally adjustable to different angles relative to said plate for the measurement of inside angles, said plate having an arcuately arranged scale thereon concentric with said pivot, said L-shaped member having pointers on both arms thereof movable relative to said scale in the pivotal adjustment of said L-shaped member relative to said plate, and means on said plate providing an inward extension of one of said bottom and side edges of said plate for co-operation with said L-shaped member in the measurement of outside angles.

10. A protractor of the character described comprising a plate having a bottom edge and a side edge at right angles to one another, an L-shaped member pivoted on and in close surface to surface abutment with said plate also having edges in right angle relationship adapted to register with the aforesaid edges of said plate, said L-shaped member being pivotally adjustable to different angles relative to said plate for the measurement of inside angles, said plate having an arcuately arranged scale thereon concentric with said pivot, said L-shaped member having pointers on both arms thereof movable relative to said scale in the pivotal adjustment of said L-shaped member relative to said plate, and means providing an extension of one of the straight edges of said plate for co-operation with the L-shaped member in the measurement of outside angles.

References Cited in the file of this patent

UNITED STATES PATENTS

| 830,727 | Long | Sept. 11, 1906 |
| 2,028,052 | Easterly | Jan. 14, 1936 |
| 2,361,807 | Wolfe | Oct. 31, 1944 |
| 2,578,077 | McKnight | Dec. 11, 1951 |
| 2,641,842 | Porter | June 16, 1953 |
| 2,689,406 | Stromquist | Sept. 21, 1954 |
| 2,840,921 | Swanson | July 1, 1958 |

FOREIGN PATENTS

| 485,656 | France | Nov. 3, 1917 |
| 218,135 | Great Britain | July 3, 1924 |